United States Patent [19]

Lieder et al.

[11] 3,933,255
[45] Jan. 20, 1976

[54] CASE MAGAZINE AND FEED APPARATUS

[75] Inventors: Gaylerd M. Lieder; Harold K. Fox, both of Minneapolis, Minn.

[73] Assignee: Bemis Company, Inc., Minneapolis, Minn.

[22] Filed: Dec. 6, 1973

[21] Appl. No.: 422,308

[52] U.S. Cl. .............. 214/8.5 K; 221/272; 221/293
[51] Int. Cl.² ........................................ B65G 59/00
[58] Field of Search ........... 214/8.5 R, 8.5 F, 8.5 G, 214/8.5 K, 8.5 SS; 221/270, 272, 292, 293

[56] References Cited
UNITED STATES PATENTS

| | | | |
|---|---|---|---|
| 730,920 | 6/1903 | Joecken | 214/8.5 K X |
| 3,433,372 | 3/1969 | Galloway | 214/8.5 F X |
| 3,690,475 | 9/1972 | Pfaffle | 214/8.5 SS |
| 3,752,361 | 8/1973 | VanLinder et al. | 221/251 |

FOREIGN PATENTS OR APPLICATIONS

| | | | |
|---|---|---|---|
| 800,432 | 12/1968 | Canada | 214/8.5 K |
| 1,054,379 | 4/1959 | Germany | 214/8.5 F |

*Primary Examiner*—Frank E. Werner
*Attorney, Agent, or Firm*—Dugger, Johnson & Westman

[57] ABSTRACT

A case magazine and case stripper part of a case opening, loader sealer machine, including longitudinal case slide rails for supporting a vertical stack of unopened, horizontal, flat folded cases, pusher assemblies mounted on a carriage that is longitudinally reciprocated by an endless chain drive to remove the lowermost case from the stack and push the lowermost case forwardly along the slide rails as the carriage moves forwardly, vertical stack support brackets located adjacent the corners of the stack extending upwardly from adjacent the elevation of the slide rails, and being mounted to be selectively adjustably positioned longitudinally and transverse relative one another, and case lifter assemblies mounted on the stack support brackets for elevating that part of the stack that is located vertically above the slide rails more than a preselected distance, automatically allowing the elevated part of the stack to bear against that part of the stack still supported by the slide rails, and thereafter elevate that part of the stack that is located more than a preselected distance above the slide rails. Each case lifter assembly includes a vertical piston cylinder combination that as the combination is operated towards its retracted position, the gripper plate and pad are moved upwardly thereby and are cammed into abutting relationship with horizontally adjacent cases for elevating cases from the part of the stack therebeneath.

4 Claims, 4 Drawing Figures

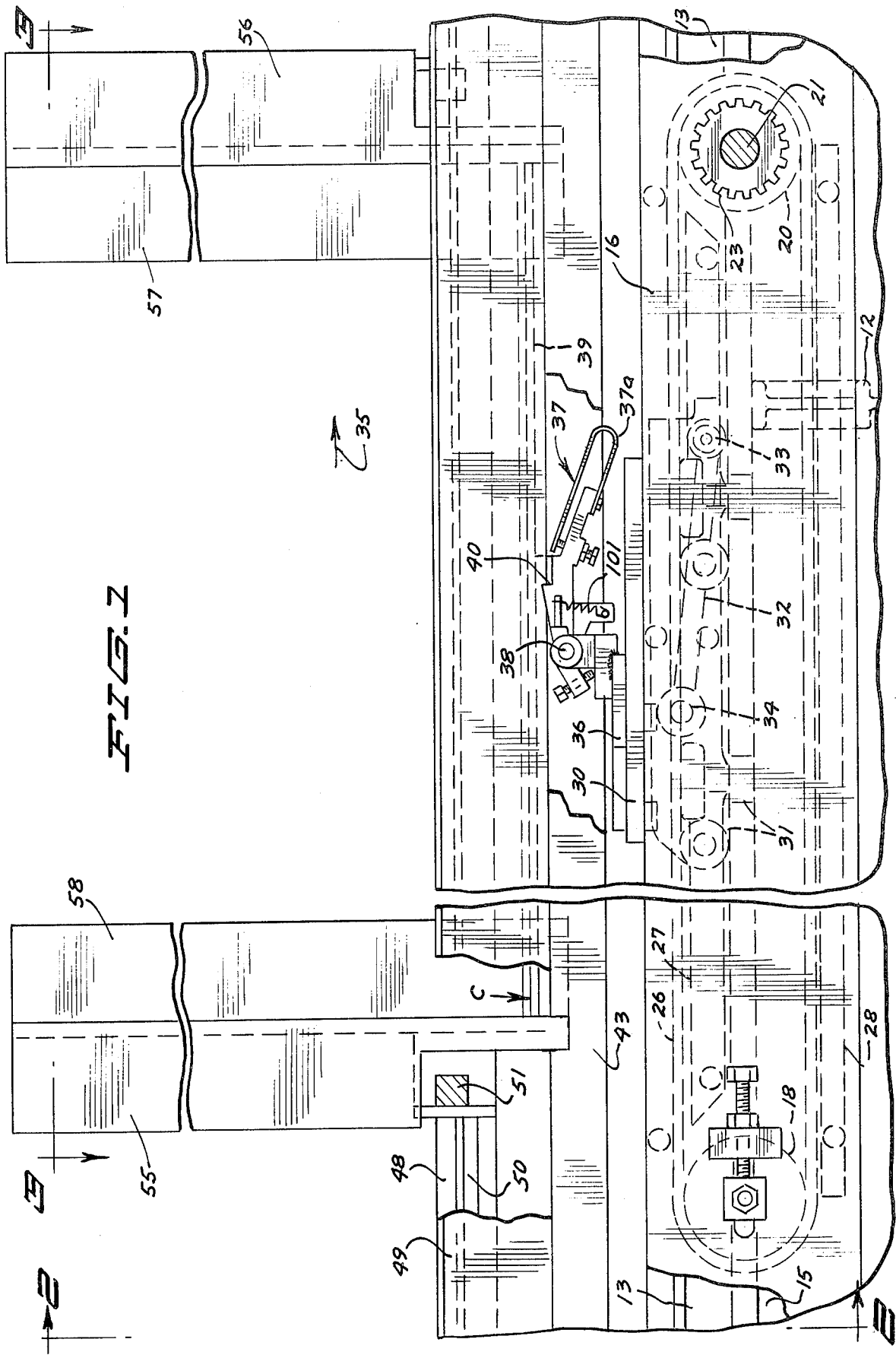

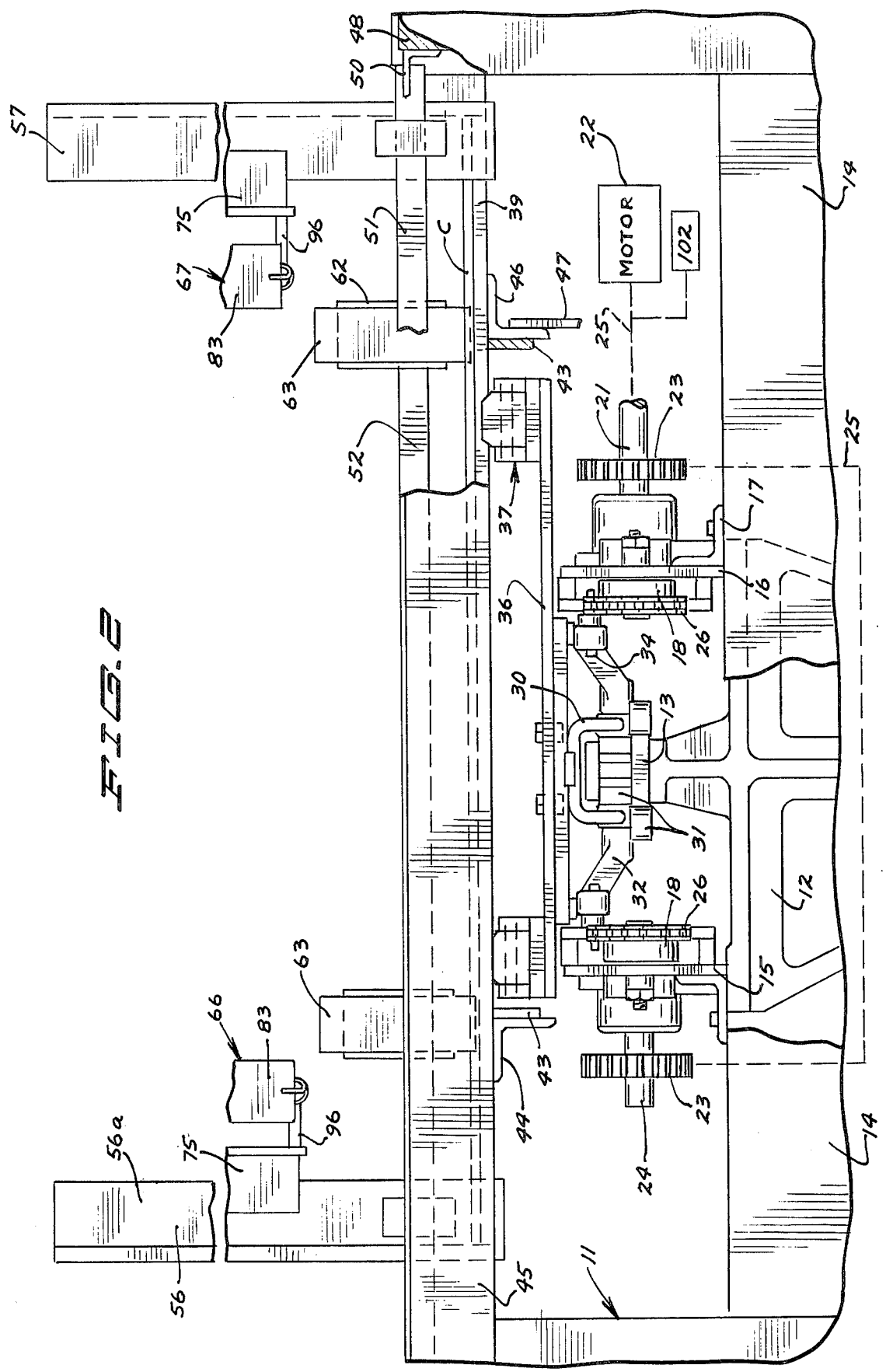

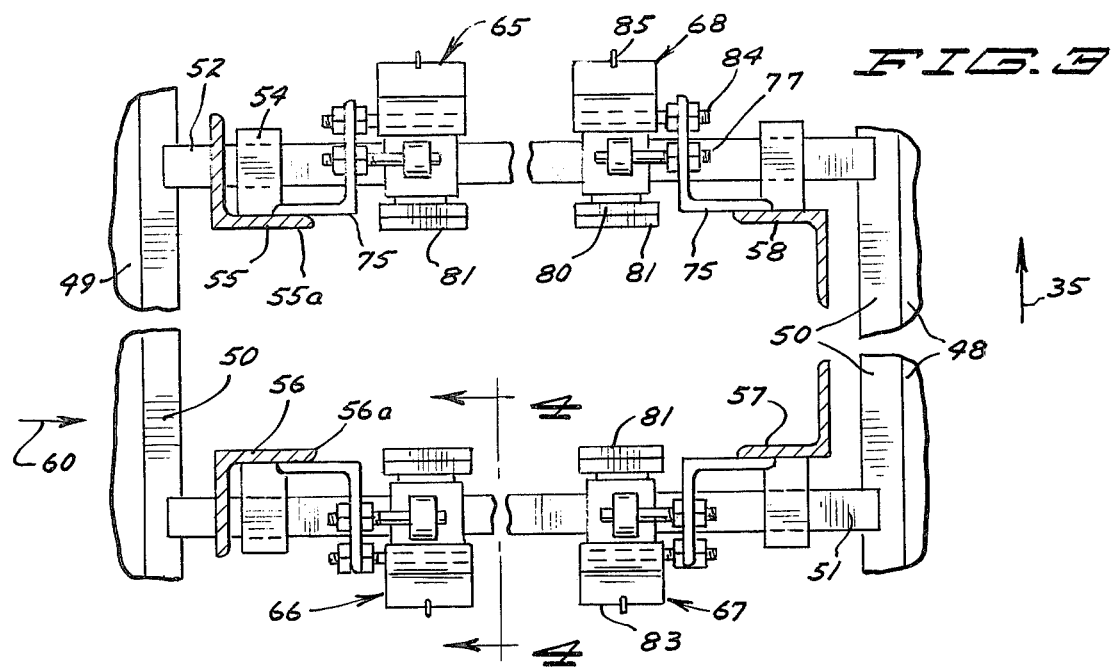
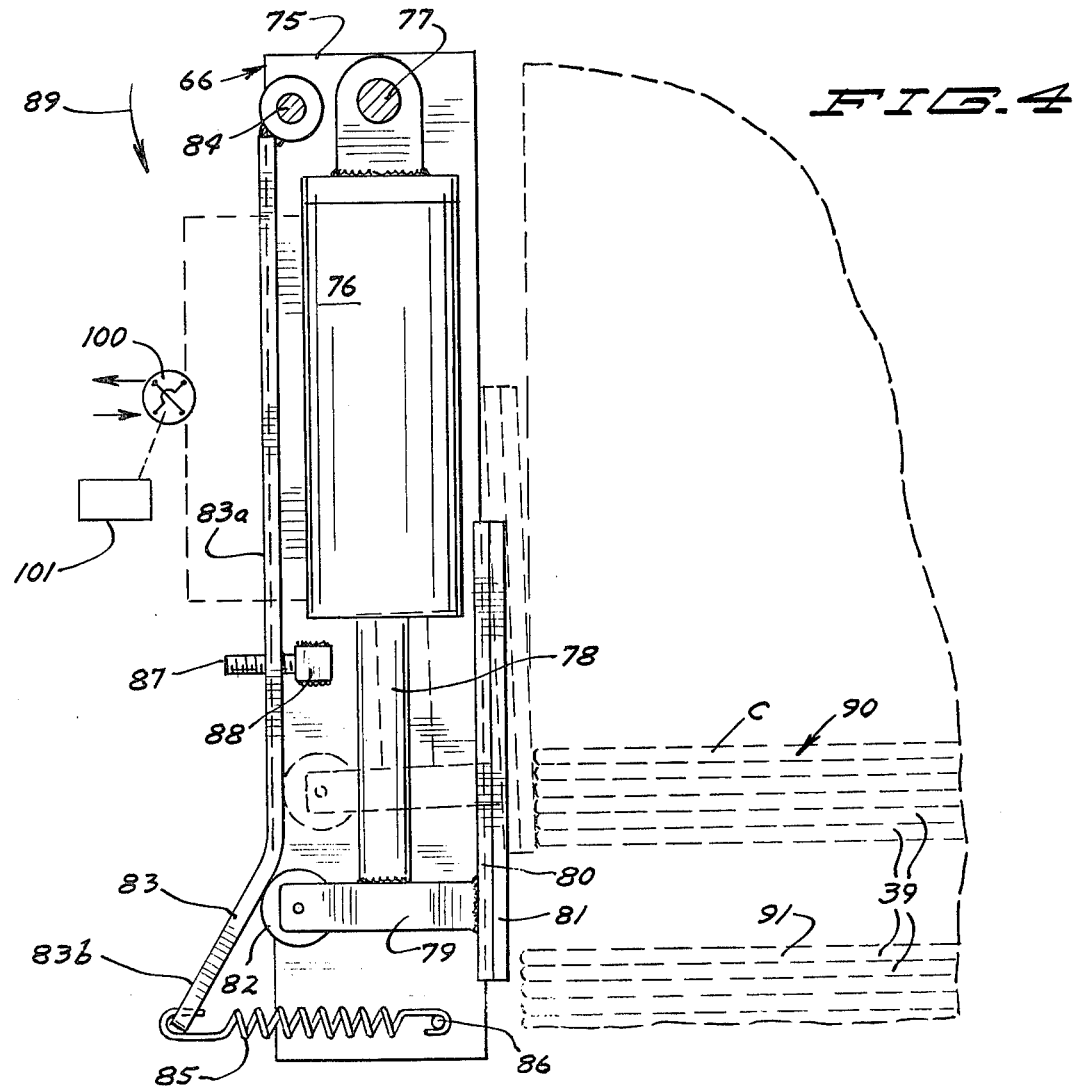

CASE MAGAZINE AND FEED APPARATUS

BACKGROUND OF THE INVENTION

Case magazine and stripping mechanism for supporting a vertical stack of unopened, horizontal, flat folded cases, and removing the lowermost case, one at a time, from the bottom of the stack and conveying the case forwardly to a location to have another work operation performed thereon.

In the prior art it is old to provide case stripper mechanism that removes one case at a time from the bottom of a vertical stack of horizontally flat folded cases in a case magazine. however, for good operation the number of cases that may be placed in the magazine at any one time is limited due to the weight of cases bearing downwardly on the lowermost case in the stack. In order to avoid problems such as the above, as well as others, this invention has been made.

SUMMARY OF THE INVENTION

Case magazine and case stripper structure that includes horizontal slide rails, a plurality of uprights for retaining a stack of flat folded, horizontal cases in generally vertical alignment on the slide rails, case stripper mechanism for moving one case at a time from beneath the stack and along the slide rails, and case lifter assemblies on the uprights for elevating an upper portion of the stack on the slide rails relative the remainder of the stack on the slide rails.

One of the objects of this invention is to provide on a case magazine for retaining cases in a flat folded horizontal condition in vertical stack relationship, new and novel mechanism for lifting a plurality of cases of the upper portion of the stack vertically above the remainder of the cases of the stack. In furtherance of the above object, it is another object of this invention to provide new and novel lift mechanism for engaging opposite edge portions of the cases to lift the cases and retain the elevated cases out of load bearing relationship to the lower portion of the stack.

BRIEF DESCRIPTION OF THE DRAWINGS

FIG. 1 is a fragmentary side view of the bag magazine and case stripping portion of a case opening, loader-sealer machine, including the mechanism for moving the bottom case forwardly from a vertical stack of unopened, horizontal, flat folded cases; various parts being broken away so as to more clearly show other parts of the structure of said portion;

FIG. 2 is a fragmentary rear end view of the structure of FIG. 1 with various portions being broken away, said view being generally taken along the line and in the direction of the arrows 2—2 of FIG. 1;

FIG. 3 is a fragmentary horizontal cross sectional view generally taken along the line and in the direction of the arrows 3—3 of FIG. 1 to more clearly illustrate the mounting of the case lifter assemblies of this invention; and FIG. 4 is a side view of one of the case lifter assemblies generally taken along the line and in the direction of the arrows 4—4 of FIG. 3, said view showing the assembly in a case release position in solid lines, and the case lifted position in dotted lines.

The case opening, loader-sealer machine includes a frame, generally designated 11, that mounts an upstanding bracket 12 at an intermediate portion thereof. A generally I shaped track 13 that is longitudinally elongated is in part mounted by the upright central portion of bracket 12 and in part by a mounting block (not shown) that is mounted on a transverse rear frame member 14. On either transverse side of the track 13, there is respectively provided a longitudinally elongated, vertical drive plate 15 and 16; the rear ends of the drive plates being attached to the frame member 14 by angle brackets 17 while intermediate portions of the drive plates are attached to the bracket 12. Each drive plate rotatably mounts an idler sprocket 18 with the sprockets being between the drive plates and no shaft extending across the space between said plates. A substantial distance longitudinally forwardly of the sprockets 18 the drive plate 16 rotatably mounts a shaft 21, which has a sprocket 20 keyed thereto while on the opposite side of the drive plate a gear 23 is keyed to the shaft. The shaft 21 is driven by motor 22. The drive plate 15 rotatably mounts a shaft 24 on which there is keyed a second sprocket 20, a gear 23 being keyed to the shaft 24 on the opposite side of the drive plate 15 from the second sprocket 20. The sprockets 20 are located between the drive plates, there being no drive shaft extending across the space between said sprockets. However, a mechanical drive connection 25 is provided between the gears 23 to drive the gears 23 in synchronism. A chain 26 is extended around the sprocket 18 and 20 that is mounted by each of the drive plates; each drive plate mounting an upper chain track 27 and a lower chain track 28 to aid and retain the upper and lower runs of the chain in generally horizontal condition.

A carriage 30 is mounted on the track 13 for reciprocal movement, the carriage having rollers 31 mounted for rotation about vertical and horizontal axes for retaining the carriage on the track. On either side of the carriage, a control link 32 has one end pivotally connected thereto by a pivot 33 while the opposite end of each control link is pivotally connected to the link of the adjacent chain 26 by a pivot member 34. As a result, with the upper runs of the chains moving in the direction of the arrow 35 and the links to which the pivot members 34 are attached are along the upper runs, the carriage is moved in the direction of the arrow 35. However, when the chain links to which the pivot members 34 are connected are part of the lower runs of the chains, the carriage is moved in the direction opposite arrow 35.

A transversely elongated plate 36 is bolted to the carriage at a higher elevation than the drive mounting plates 15, 16, and at either end mounts a pivot member 38 that in turn mounts a case pusher assembly 37. The case pusher assemblies are resiliently retained in a position to have edges 40 thereof abut against the rear edge of a case 39 as it is being moved from beneath a vertical stack of cases; but when the case has been pushed from beneath the stack and the pusher assemblies are being moved in the direction opposite arrow 35, can pivot downwardly to be moved beneath the stack of cases. Since the pusher assemblies are of a conventional construction, they will not be further described.

For supporting a plurality of unopened cases in vertical stacked, horizontal positions, there are provided a plurality of transversely spaced, longitudinally elongated case slide rails 43 that at their one ends are secured to angle brackets 44 which in turn are dependingly mounted by rear transverse frame member 45 and at their opposite ends by brackets 46 that in turn are mounted by frame members 47. The top edges of the case slide rails support the lowermost case in stack C at an elevation that has a rearward edge thereof engaged by edges 40 when the case pusher assemblies are moved forwardly from their rearwardmost positions in the direction of arrow 35 (only two cases of stack C being shown in FIG. 2).

The frame includes longitudinally elongated, parallel, top frame members 48 and 49 that are located transversely outwardly of the case slide rails and the drive mounting plates 15, 16 and have their top portions located at a substantially higher elevation than said rails and plates. Each of the frame members 48, 49 mounts a longitudinally elongated angle bracket 50 to have the angle bracket horizontal leg extend toward the other. The transversely elongated rear magazine rail 51 has a slot at either end into which the horizontal leg of the adjacent angle bracket 50 extends whereby the rail is mounted by the angle brackets to be selectively adjustably longitudinally positioned along the length thereof. Clamp bolts (not shown) are provided on the slot end portions of the rail 51 for retaining the rail in selected longitudinally adjusted positioned. Similarly, a front magazine rail 52 of the same construction as rail 51 is mounted by the angle brackets 50 to be retained in selected longitudinally adjusted positions on the angle brackets.

In order to retain the cases in vertical stacked relationship, the magazine portion includes four angle brackets 55, 56, 56 and 58 respectively; each of which has a clamp member 54 secured to the lower end portion thereof (see FIG. 3). Angle brackets 55 and 56 are mounted on rail 52 and 51 respectively by their clamp members to have their transverse legs 55a, 56a adjacent and facing one another while their longitudinal legs extend more remotely from one another than the transverse legs, brackets 55, 56 being adjacent frame member 49. The angle brackets 58 and 57 are mounted by clamp members on the rails 52 and 51 respectively adjacent frame member 48 to have their transverse legs face one another and more remotely positioned from one another than their longitudinal legs. Through the provision of the clamp members, the transverse spacing of brackets 57, 58 relative angle irons 55, 56 may be selectively varied and thence the clamp members tightened by convention structure (not shown) for retaining the angle irons in their selected transverse adjusted conditions. Further, due to the manner of mounting of the angle irons 55, 56 the cases in a flat folded horizontal condition may be moved inwardly therebetween in the direction of the arrows 60 while the longitudinal extending legs of angle irons 57, 58 limit the movement of the cases in the direction of the arrows 60. The longitudinally forward surfaces of the transverse legs of angle irons 57, 56 are located in a common vertical, transverse plane, the longitudinally rearwardly surfaces of the transverse legs of angle irons 55, 58 are in a common transverse vertical plane and the surfaces of the longitudinal legs adjacent their transverse legs are located in a common longitudinal vertical plane to facilitate retaining the cases in a vertical stacked relationship. The angle irons 56, 57 extend to a lower elevation than the top edges of the case slide rails 43 while the lower edges of the angle irons 55, 58 are located at an elevation that is at least the height of one case in a flat folded horizontal condition vertically above the top edges of the slide rails to permit the bottom case in the stack in the flat folded condition to be slid on the side rails therebeneath.

Mounted on the angle brackets 55 to 58 respectively are case lifter assemblies, generally designated 65 to 68. Each case lifter assembly includes a bracket 75 that is welded to the respective bracket 55 to 58, and a cylinder 76 that has its upper end connected to the bracket by a pivot member 77 to permit the cylinder pivotally about a transverse axis. The cylinder has a downwardly extending piston rod 78 which at its lower end mounts a generally longitudinally extending bar 79. One end of the longitudinal bar mounts a generally vertically extending gripper plate 80 which in turn mounts a vertically elongated resilient gripper pad 81. The opposite end of the bar 79 mounts a cam plate 82 for bearing against the vertically elongated cam plate 83. The upper end of the cam plate is pivotally mounted on a transverse pivot 84 which in turn is mounted on the bracket 75 to have a pivot axis parallel to the pivot axis of pivot member 77. A vertically intermediate portion of the cam plate has an adjustment bolt 87 threaded therein that is abuttable against a stop 88 which is welded to the bracket 75, the adjustment bolt serving to limit the pivotal movement of the cam plate about pivot 84 in the direction of the arrow 89 toward the gripper plate. A pin 86 is secured to the bracket 75 for mounting one end of coil spring 85, the opposite end of the spring being connected to the lower end of the cam plate 83. Spring 85 constantly resiliently urges the cam plate to pivot in the direction of the arrow 89 about pivot 84 to a position that the adjustment bolt 87 abuts against stop 88.

The brackets 75 are mounted on the brackets 55–58 so that when the piston rod of the respective case lifter assembly is in an extended position, the transverse vertical surface of the resilient pad opposite the gripper plate is substantially located in the transverse vertical plane of the surfaces of the transverse legs of the angle brackets 55–58 respectively that mounts the case lifter assembly; and in the piston rod retracted position to have the pad case engaging surface extend substantially longitudinally more closely adjacent the longitudinally opposite case lifter assembly. In order that the gripper pads move longitudinally toward the longitudinally opposite gripper assembly as the respective piston rod is retracted, each of the cam plates has a generally vertically elongated upper end portion 83a that extends downwardly from pivot 84 to an elevation substantially lower than bar 79 in the piston rod retracted position, the lower end of portion 83a being joined to an elongated inclined portion 83b that extends downwardly in a direction longitudinally away from the gripper plate of the respective lifter assembly. To be noted is that the vertically upper-most part of portion 83b is at a higher elevation than the cam follower 82 in a piston rod extended position. Further, the angle of inclination of portion 83b is such that when the piston rod is in a lower extended position and cam follower 82 bears against surface 83b, the case engaging surface of pad 81 will extend generally vertically to be located in the plane of the case engagable surface of the respective bracket 55–57 or slightly longitudinally spaced therefrom in a longitudinal direction slightly more remote from the vertically stacked cases on the case slide rails.

The gripper pads of assemblies 66, 67 are located transversely between brackets 56, 57; while the gripper pads of assemblies 65, 68 are located transversely between brackets 55, 58. Additionally, the bag lifter assemblies are mounted on the brackets 55–58 at an elevation substantially vertically above the elevation of the case side rails, for example a height of 30 to 50 horizontal, flat folded cases.

In using the apparatus of this invention, the vertical elevation of the escape plates 63 in the escape plate holder 62 is adjusted so that the bottom edges of the escape plates is at an elevation higher than the elevation of the top edges of the case slide rails by a distance that is greater than the height of one case in a flat folded condition, but substantially less than the height of two cases in a stacked flat folded condition. Additionally, the longitudinal spacing of transfer rails 51, 52 is adjusted, if necessary, so that the spacing of the adjacent transverse surfaces 55a, 56a is slightly greater than the longitudinal length of a flat case in the horizontal condition. Further, the transverse positions of the brackets 55–58 are adjusted, if necessary so that the cases in abutting against the longitudinal legs of brackets 57, 58 will be in a generally transverse centered position between frame members 49, 48 and the cases will extend longitudinally between brackets 55, 56. Now, with the case lifter assembly piston rods in their extended condition, flat cases are moved transversely in direction of the arrow 60 to be stacked on the slide rails 43 and have their one longitudinally extending edges closely adjacent the transverse legs of brackets 57, 58.

With the flat cases stacked on the slide rails, the machine is started and through a valve 100 and other suitable controls (not shown) fluid under pressure is applied to the lower ends of the cylinders 76. This results in the cam followers 82 moving vertically upwardly along the surfaces 83b, and as the cam followers are moved upwardly, the grip pads 81 are moved upwardly and longitudinally toward the horizontally adjacent cases and into abutting contact therewith to exert a lifting force on the cases that they abut against. The characteristics of springs 85 are such that as the followers move upwardly along surface portions 83b, the plates 83 can pivot in the direction opposite arrow 89 to prevent the gripping pads exerting a sufficient horizontal force against the cases to damage the cases; but at the same time exert a sufficient force that the cases will be elevated with the gripping pads as the cam follower moves upwardly along the surfaces of cam plate portions 83a. As a result of the piston rods moving to their retracted positions, the cases indicated in FIG. 4 by reference numeral 90 will be lifted up from the cases indicated by reference numeral 91 to be vertically spaced therefrom. It is to be understood that the cases indicated by reference numeral 91 extend downwardly to and are supported by the slide rails 43. Thus, with the above mentioned separation of the cases 90 from the cases 91, a considerable part of the weight of the cases that are located between the brackets 55–58 is supported by the case lifter assemblies and not by the cases that are supported by the slide rails.

With the part 90 of the stack of cases separated from the part of the stack 91, and the motor 22 energized, and assumming that the pusher assemblies are in their longitudinally rearmost position, the carriage will be moved in a forward direction (arrow 35) to bring the pusher plate portions 37a into underlying relationship to the rearward edges of the cases 91. As may be noted, the pusher plate portions 37a are inclined upwardly in a rearward direction so that as the pusher plate portions 37a moves forwardly, the pusher plate assemblies are pivoted on pivot members 38 against the resilient action of the springs 101 to an elevation that edges 40 will abut against only the rear edge of the lowermost case on the slide rails. Thereafter, further forward movement of the carriage results in the lowermost case 39 being moved forwardly from beneath the stack 91 to other parts of the machine (not shown) where at folding and other operations are carried out on the case to form a box. After the lowermost case has been moved completely forwardly of the escape plates, the pivot members 34 are moved by the chain 26 downwardly around sprockets 20 and thence rearwardly to retract the carriage and the structure mounted thereon. Thereafter the pivots 34 move around sprockets 18 and along the length of the upper run whereby carriage 30 moves the pusher assemblies to move the new lowermost case on the stack 91 in the forward direction. This series of operations is continued until a predetermined number of cases from the stack portion 91 has been removed from the magazine. There upon a suitable control, for example, a photoelectric eye unit, or a counter 102, that is operatively connected to the drive for the gears 23, for example drive connection 25, automatically actuates the control valve 100 for the cylinders 76 to apply fluid under pressure to their upper ends. This results in the piston rods 78 being moved in a downwardly direction, and as the cam followers move onto and downwardly along surface portions 83b, the longitudinally opposite gripper plate pads moves sufficiently apart that the cases 90 supported thereby drop onto the remaining cases of part 91 of the stack. After the piston rods have moved to their lowermost positions, the controls automatically again apply fluid under pressure to the lower ends of the cylinders for retracting piston rods whereupon the gripper pads again elevate the part of the stack of cases in the manner previously described. The last mentioned extension and retraction of the piston rods takes place between the time that the carriage has been moved too its longitudinal forwardmost position and the time that it is again moved longitudinally forwardly.

What is claimed is:

1. For removing a case from a vertical stack of cases in horizontal, flat folded conditions that have elongated first edge portions and elongated edge portions opposite the first edge portions, a frame, longitudinally elongated slide means on the frame for supporting the stack of cases, means mounted on the frame for retaining the cases in the stack in generally vertical alignment while permitting the lowermost case of the stack being slid along the slide means from beneath the stack, stripper means mounted on the frame for moving the lowermost case along the slide means from beneath the stack and lifter means mounted on the vertical alignment means for engaging cases in the stack that are located more than the thickness of a plurality of cases above the slide means to lift engaged cases and retain the lifted cases in vertical spaced relationship to the remainder of the cases in the stack and separated therefrom, and subsequently release the lifted cases to fall toward the slide means, the lifter means including a generally vertical case engaging lifter member, a vertically elongated cam member having at least a lower portion that extends downwardly and away from the stack, vertically movable means for mounting the case engaging lifter member and vertically movably engaging the cam member lower portion to move the case engaging lifter member toward the adjacent case edge portions as it moves vertically upwardly along said cam member lower portion, power means secured to the vertically movable means for selectively moving the vertically movable means upwardly and downwardly in engagement with the cam member and means for mounting the cam member and power means on the vertical alignment means.

2. The apparatus of claim 1 further characterized in that the power means includes a piston rod that mounts the vertically movable means.

3. Apparatus for removing a case from a vertical stack of cases in horizontal, flat folded conditions, the cases having elongated first edge portions and second elongated edge portions opposite the first edge portions, comprising a frame, longitudinally elongated slide means on the frame for supporting the stack of cases, means mounted on the frame for retaining the cases in the stack in generally vertical alignment while permitting the lowermost case of the stack being slid along the slide means from beneath the stack, the alignment means including first and second uprights respectively adjacent the first and second edge portions, stripper means mounted on the frame for moving the lowermost case along the slide means from beneath the stack and lifter means mounted on the vertical alignment means for engaging cases in the stack that are located more than a given distance above the slide means for lifting the engaged cases and retaining the engaged cases in vertical spaced relationship to the remainder of the cases in the stack, the above mentioned lifter means including first lifter means mounted on the first upright for liftingly engaging the first edge portions and second lifter means mounted on the second upright for liftingly engaging the second edge portions, each of the first and second lifter means including a generally vertical case engaging lifter member, a generally vertical piston cylinder combination having a piston rod and a cylinder, means for mounting the cylinder on the respective upright, means for connecting the lift member to the piston rod to move therewith, the last mentioned means including a cam follower, and cam means mounted on the cylinder mounting means for moving the cam follower toward the adjacent case edge portions as the piston rod moves upwardly, the cylinder mounting means including means mounting the cylinder for pivotal movement about an axis parallel to the direction of elongation of the case edge portions.

4. The apparatus of claim 3 further characterized in that the cylinder mounting means includes a bracket, that the cylinder pivot means is mounted on said bracket, that the cam means includes a vertically elongated cam member and a pivot member mounted on said bracket for mounting the cam member for pivotal movement about an axis parallel to the pivotal axis of the cylinder pivot means, and that there is provided resilient means connected to said bracket for resiliently urging the cam member toward the cam follower, and stop means on the bracket for limiting the pivotally movement toward the cam follower.

* * * * *